United States Patent Office 3,663,551
Patented May 16, 1972

3,663,551
PRODUCTION OF ISOCARBOSTYRILS
Antoon M. Deryckere, Uccle, and Fernand J. F. Eloy, Rhode-Saint-Genese, Belgium, assignors to Union Carbide Corporation
No Drawing. Filed July 5, 1968, Ser. No. 742,531
Int. Cl. C07d 35/30
U.S. Cl. 260—283 SY          7 Claims

ABSTRACT OF THE DISCLOSURE

Isocarbostyrils are produced by heating styryl isocyanates, many of which are new compounds.

---

The invention relates to a process for producing isocarbostyrils by heating a styryl isocyanate. The invention also relates to certain novel styryl isocyanates and isocarbostyrils.

Isocarbostyrils are a known class of compounds having known utility as intermediates in the production of dyes, anti-oxidants, and the like. In addition, isocarbostyrils can be reacted with ethylene oxide to produce surfactants. Various methods have been reported for the production of isocarbostyrils. For instance, Eiden and Nagar, Arch. Pharm., 297, 488 (1964), reported that certain isocarbostyrils can be produced by heating an N-styryl urethane:

(a) [structure: phenyl-C(R)=CHNHCO$_2$C$_2$H$_5$] $\xrightarrow{\Delta}_{-HOC_2H_5}$ [structure: isoquinolinone (keto tautomer)]

A limitation in the published results of the Eiden-Nagar synthesis is that R must be an electron-withdrawing group such as —CN, —COOCH$_3$, or phenyl. Reported attempts to carry out this synthesis when R was hydrogen have been unsuccessful, even when acidic condensing agents (sulfuric acid, phosphorus pentoxide, phosphorus oxychloride) were used—ref., Dey et al., Chem. Abs. 42, 3406 (1948).

Manske et al., J. Am. Chem. Soc., 67, 95 (1945), reported the preparation of 6,7,8-trimethoxy-3,4-dihydroisocarbostyril by heating beta-(3,4,5-trimethoxyphenyl)ethyl isocyanate or its ethyl carbamate ester in the presence of major amounts of phosphorus pentoxide and phosphorus oxychloride condensing agents:

(b) [structure: 3,4,5-trimethoxyphenyl-CH$_2$CH$_2$NCO] $\xrightarrow[POCl_3]{P_2O_5,\Delta}$ [structure: 6,7,8-trimethoxy-3,4-dihydroisoquinoline]

(c) [structure: 3,4,5-trimethoxyphenyl-CH$_2$CH$_2$NHCOC$_2$H$_5$] $\xrightarrow[POCl]{P_2O_5,\Delta}$ [structure: 6,7,8-trimethoxy-3,4-dihydroisoquinoline]

In one case, the product of a reaction (c) synthesis was dehydrogenated to the corresponding isocarbostyril—ref., Anderson et al., J. Am. Pharm. Soc., 41, 643 (1952).

Many other methods for producing isocarbostyrils are known. For instance, isocarbostyrils can be synthesized from (d) isocoumarins, e.g., Ungnade et al., J. Org. Chem., 10, 533 (1945); from (e) homophthalic acid, e.g., Rydon et al., J. Chem. Soc., 1962; 4687; and from (f) phthalaldehydic esters, e.g., King et al., J. Chem. Soc. (1942), 726.

The foregoing methods all have certain disadvantages. In method (a), it is reported to be necessary to have an electron-withdrawing group in the alpha-styryl position. Methods (b) and (c) require the use of large proportions of condensing agents to carry out the ring closure reaction, and they require the further step of dehydrogenation in order to produce isocarbostyrils. Methods (d), (e) and (f) are multi-step syntheses from difficulty available starting reactants. Thus except for unsubstituted isocarbostyril (which can be obtained in one step by treating isoquinoline with alkali), there has been no convenient, economic method for the production of the valuable class of compounds, the isocarbostyrils.

The present invention is based upon the discovery that isocarbostyrils can be produced in good yield by heating styryl isocyanates. The process can be carried out without using any condensing agents, and it is not necessary for the styryl isocyanate to have an electron-withdrawing group in the alpha-styryl position. Economic advantages are also obtained since styryl isocyanates can be synthesized in four convenient steps from readily available benzaldehydes.

The process of the invention can be represented by the following reaction.

(g) [structure: (R$^1$)$_5$-phenyl-C(R$^2$)=C(R$^3$)NCO] $\xrightarrow{\Delta}$ [structure: isocarbostyril with R$^1$, R$^2$, R$^3$ substituents, positions 4,5,6,7,8 and 2NH, C=O]

The styryl isocyanates that are employed in the invention can be represented by Formula I:

(I) [structure: (R$^1$)$_5$-phenyl-C(R$^2$)=C(R$^3$)-NCO]

wherein each R$^1$ individually can be hydrogen, alkyl, alkoxy, halo, two R$^1$ variables joined together to form a ring which can contain heterocyclic atoms, and the like, provided that at least one R$^1$ represents hydrogen in a position ortho to the —CR$^2$=CR$^3$—NCO moiety, and wherein R$^2$ and R$^3$ individually represent hydrogen, alkyl, and the like. Specific illustrative styryl isocyanates that can be used include the following:

styryl isocyanate,
4-methylstyryl isocyanate,
2-methylstyryl isocyanate,
3-methylstyryl isocyanate,
4-ethylstryryl isocyanate,
3-isopropylstyryl isocyanate,
2-butylstyryl isocyanate,
4-pentylstyryl isocyaante,
3-hexylstyryl isocyanate,
4-octylstyryl isocyanate,
4-decylstyryl isocyanate,
4-dodecylstyryl isocyanate,
3,4-dimethylstyryl isocyanate,
2,3,4-trimethylstyryl isocyanate,
3-methoxystyryl isocyanate,
4-methoxystyryl isocyanate,
3,4-dimethoxystyryl isocyanate,
2,3,4-trimethoxystyryl isocyanate,
3,4,5-trimethoxystyryl isocyanate,
3,4-methylenedioxystyryl isocyanate

[structure: methylenedioxyphenyl-CH=CHNCO]

6-isocyanatovinylbenzofuran

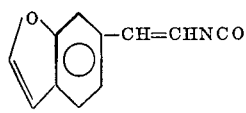

2-isocyanatovinylnaphthalene

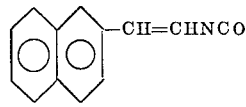

7-isocyanatovinyl-2H-1-benzopyran

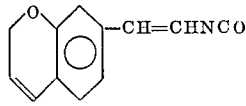

6-isocyanatovinylquinoline

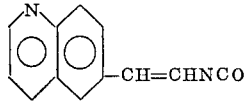

3-chlorostyryl isocyanate,
4-bromostyryl isocyanate,
and the like.

Other useful styryl isocyanates include:

alpha-methylstyryl isocyanate, alpha-butylstyryl isocyanate, 4-methoxy-beta-methylstyryl isocyanate, alpha,-beta-dimethylstyryl isocyanate, 4-chloro-beta-methylstyryl isocyanate, and the like.

The preferred styryl isocyanates are those which contain lower alkoxy (i.e., $C_2$ to $C_4$) substituents, especially methoxy substituents, chloro substituents, lower alkyl substituents, especially methyl, and those styryl isocyanates which contain a five or six membered oxygen- or nitrogen-containing heterocyclic ring fused to the aromatic ring. In general, the $R^1$, $R^2$, and $R^3$ variable individually will contain not more than 18 carbon atoms.

Styryl isocyanates can be produced by known reactions from benzaldehydes, which are readily available starting reactants. The styryl isocyanates wherein $R^2$ and $R^3$ are hydrogen can be produced by the following sequence of reactions:

(g) The Knoevenagel-Doebner condensation of aldehydes with malonic acid to form a cinnamic acid—ref., p. 732, "Organic Chemistry," Fieser & Fieser, Second ed., D. C. Heath and Company, Boston (1950):

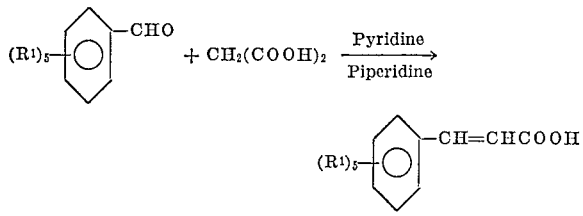

($R^1$ is as defined in Formula I);

(h) Reaction of a cinnamic acid with thionyl chloride to produce the corresponding acid chloride—ref., Fieser & Fieser, p. 183:

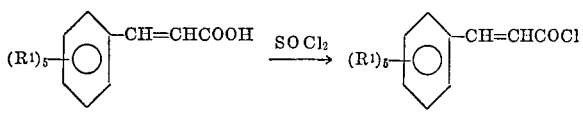

(i) Reaction of a cinnamoyl chloride with sodium to produce a cinnamoyl azide—ref., Fieser & Fieser, p. 229:

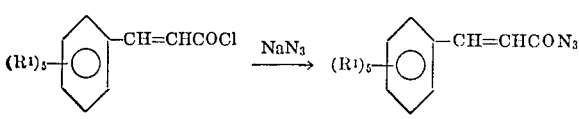

(j) The Curtious rearrangement of the cinnamoyl azide to a styryl isocyanate—reg., Fieser & Fieser, p. 229:

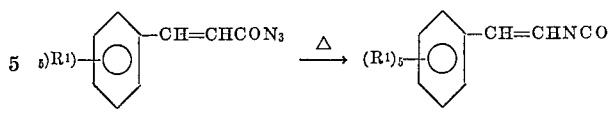

Styryl isocyanates wherein $R^2$ and/or $R^3$ are alkyl, can be obtained by the following modifications of the foregoing sequence of reactions:

(k) The Reformatsky reaction of aldehydes or ketones with halogeno esters in the presence of zinc—ref., Fieser & Fieser, page 733:

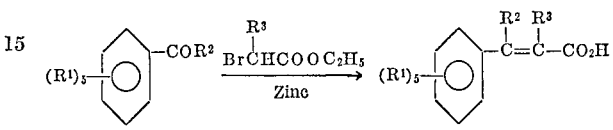

wherein $R^1$, $R^2$, and $R^3$, are as defined above with respect to Formula I. The substituted cinnamic acid is then reacted in accordance with the sequence of reactions (h) through (j).

Other routes to substituted cinnamic acids include:

(1) The Perkin reaction of aldehydes with acid anhydrides in the presence of their corresponding sodium salt—Ref., Fieser & Fieser, pp. 730–731:

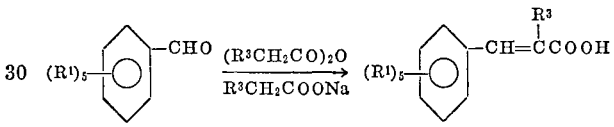

($R^1$ and $R^3$ are as defined in Formula I):

(m) The Claisen condensation of aldehydes with esters in basic medium—ref., Fieser & Fieser, p. 732:

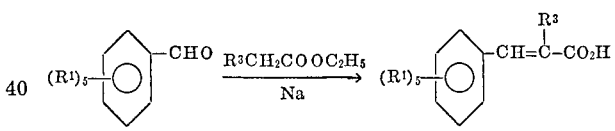

($R^1$ and $R^3$ are as defined in Formula I).

The process of the invention comprises heating a styryl isocyanate at an elevated temperature for a period of time sufficient to produce an isocarbostyril. If desired, the styryl isocyanate can be produced in situ by heating the corresponding cinnamoyl azide at 60–70° C. until evolution of nitrogen ceases, after which the reaction mixture is heated to a higher temperature to effect the ring closure reaction. The exact temperature at which the styryl isocyanate must be heated in order to produce the isocarbostyril is dependent, in part, upon the exact nature of the reactant. In general, however, the reaction occurs at a temperature within the range of from about 200° C. to about 300° C., and preferably from about 220° C. to about 280° C. It is most convenient to carry out the reaction by refluxing the styryl isocyanate in an inert, liquid reaction medium that boils within the temperature range indicated above. Such reaction mediums include diphenyl ether, the dibutyl ether of diethylene glycol, the acetate ester of the monobutyl ether of diethylene glycol, benzophenone, dimethyl phthalate, and the like. Diphenyl ether is the preferred reaction medium.

The exact reaction time varies to an extent, depending upon the nature of the styryl isocyanate, reaction medium, and reaction temperature. In most cases, the reaction will be completed in from about ½ to about 4 hours, and preferably from about 1 to about 3 hours.

The isocarbostyril can be recovered by conventional procedures. For instance, the reaction medium can be removed by distillation under vacuum, the isocarbostyril can then be dissolved in diethyl ether, and then recrystallized from benzene.

In addition to the utility mentioned above, isocarbostyrils can be used to produce s-triazolo[3,4-a]isoquinolines of known utility (e.g., see U.S. Pat. No. 3,354,164) by the following route:

(n) 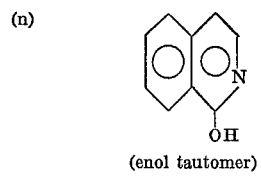

(enol tautomer)

(o) 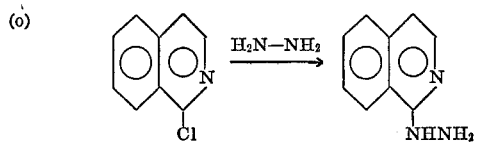

(p) 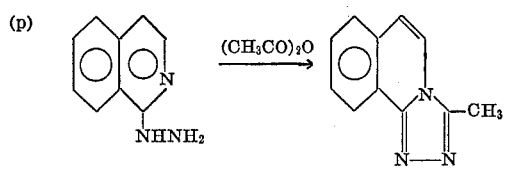

The examples which follow illustrate the invention. Unles otherwise stated, parts are by weight and all temperatures are given in centigrade. Compounds that are marked with a superscript [a] have not been reported previously.

in 400 ml. dioxane. After one hour stirring, the mixture is poured out on ice and filtered (M.P. 55°).

3-methoxystyryl isocyanate[a].—A solution of 50 g. (0.25 mole) dry acyl azide in 150 ml. dry benzene is refluxed for 8 hours and then evaporated. The residue is distilled under reduced pressure. The isocyanate boils at 120°/3 mm. Hg. Yield: 95% from the acid chloride.

6-methoxyisocarbostyril.—(a) A solution of 31.8 g. (0.2 mole) styryl isocyanate in 100 ml. diphenyl ether is refluxed for 1½ hours. The solvent is evaporated under vacuum and the residue is worked up with ether and filtered. The crude isocarbostyril is recrystallized from benzene (M.P. 180° yield: 56%) (overall yield—42%).

(b) Alternatively, a solution of 50 g. (0.25 mole) acyl azide in 150 cc. diphenyl ether is maintained a few hours at 75° until the evolution of nitrogen is terminated. The solution is then refluxed for 1.5 hour and worked up as indicated above in (a).

EXAMPLES 2–10

By procedures analogous to those described in Example 1, a series of isocarbostyrils were prepared from the corresponding benzaldehydes (with Example 8, the cinnamic acid intermediate was prepared as reported by D. Hamer, J. Chem. Soc., 1964, 1847). Table I, below, displays various physical constants and yields of the intermediates and isocarbostyril products:

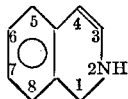

TABLE I.—SYNTHESIS OF ISOCARBOSTYRILS

| Example number | Substituents (on isocarbostyril) | Cinnamic acids A, yield, percent | Cinnamoyl chlorides B | Cinnamoyl azides C | Styryl isocyanates D | Isocarbostyrils E M.P., °C. | Yield, percent | Overall yield, percent |
|---|---|---|---|---|---|---|---|---|
| 2 | 7-CH$_2$O | 93.6 | Yield 90% | Yield 83% | Yield 95% | 207 | 62 | 41 |
| 3 | 7-CH$_3$ | 90 | Yield 100% | M.P. 65° [a] | B.P. 90°/1 mm. Hg,[a] yield 74% (from B). | 162 | 51 | 34 |
| 4 | 7-Cl | 73 | Yield 98% | M.P. 84° [a] | B.P. 110°/0.1 mm. Hg,[a] yield 86% (from A). | [a] 235 | 69 | 43.5 |
| 5 | 6,7-CH$_2$O$_2$ | 94 | M.P. 137° litt.$^{18}$ 40°. | M.P. 125° [a] | B.P. 130°/1 mm. Hg [a] | [a] 278 | [1] 53.5 | 50 |
| 6 | 5,6,7-(CH$_3$O)$_3$ | 94 | Not purified [a] | Oily crude material | B.P. 140°/0.1 mm. Hg,[a] yield 68% (from A). | 165 | 81 | 51.5 |
| 7 | 6,7,8-(CH$_3$O)$_3$ | 80 | Yield 95% | M.P. 119° [a] | B.P. 139°/0.1 mm. Hg,[a] yield 59% (from A). | [a] 198 | 21 | 10 |
| 8 | 7-Cl, 3-CH$_3$ | 50 | Not purified [a] | M.P. 62° [a] | B.P. 85–90/0.1 mm. Hg,[a] yield 78% (from A). | [a] 284 | 89 | 35 |
| 9 | 6,7-(CH$_3$O)$_2$ | 91.5 | ....do.[a] | M.P. 103° [a] | B.P. 130–140/0.1 mm. Hg,[a] yield 75% (from A). | 237 | 76.6 | 46 |
| 10 | H | (²) | Yield 86% | M.P. 86° | Yield 88% from B | 212 | 64 | 48.5 |

[1] From A.
[2] Commercial compound.
[a] New compound.

EXAMPLE 1

6-methoxyisocarbostryil 3-methoxycinnamic acid.—Prepared as reported in Sulzbacher et al., J. Applied Chem. 1, 95 (1951), from 3-methoxybenzaldehyde.

3-methoxycinnamoyl chloride[a].—A mixture of 89 g. (0.5 mole) 3-methoxycinnamic acid, 130 ml. SOCl$_2$ and 400 ml. dry benzene is refluxed for two hours and then evaporated under reduced pressure. The residue is distilled under vacuum. The acid chloride distills at 120°/1 mm. Hg. The oil solidifies on standing (M.P. 45°). Yield: 73%.

3-methoxycinnamoyl azide[a].—39 g. (0.6 mole) NaN$_3$ are suspended in a mixture of 68 ml. water and 68 ml. dioxane. To this mixture cooled at 0° is added slowly a solution containing 64 g. (0.3 mole) of acid chloride In Table II, below, elemental analyses of certain of the isocarbostyril products are displayed:

TABLE II

| | Analysis of isocarbostyrils, percent | | | | | |
|---|---|---|---|---|---|---|
| | Calculated | | | Found | | |
| Ex. No. | C | H | N | C | H | N |
| 1 | (¹) | (¹) | (¹) | (¹) | (¹) | (¹) |
| 2 | (²) | (²) | (²) | (²) | (²) | (²) |
| 3 | 75.5 | 5.66 | 8.81 | 75.98 | 5.63 | 9.14 |
| 4 | 60.2 | 3.34 | 7.8 | 59.94 | 3.28 | 8.22 |
| 5 | 63.50 | 3.70 | 7.40 | 63.86 | 3.80 | 7.61 |
| 6 | 61.23 | 5.52 | 5.96 | 61.02 | 5.69 | 6.02 |
| 7 | 61.23 | 5.52 | 5.96 | 61.25 | 5.67 | 6.10 |
| 8 | 62.00 | 4.13 | 7.23 | 62.45 | 4.26 | 7.21 |

[1] Identical with a sample prepared according to Bischer-Napieralski process (Reaction (c), above, plus dehydrogenation with palladium on carbon).
[2] Identical with the compound described by Ungnade (J. O. Chem. 10 533)145).

Specific identification of the novel intermediate compounds and specific identification of each of the isocarbostyril products of Examples 2–10 are as follows:

EXAMPLE 2

7-methoxyisocarbostyril (known)

EXAMPLE 3

4-methylcinnamoyl azide
4-methylstyryl isocyanate
7-methoxyisocarbostyril (known)

EXAMPLE 4

4-chlorocinnamoyl azide
4-chlorostyryl isocyanate
7-chloroisocarbostyril (novel)

EXAMPLE 5

3,4-methylenedioxycinnamoyl azide
3,4-methylenedioxystyryl isocyanate
1,3-dioxolo[4,5-g]isoquinolin-5-one (novel)

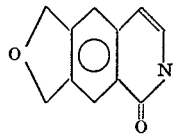

EXAMPLE 6

2,3,4-trimethoxycinnamoyl chloride
2,3,4-trimethoxycinnamoyl azide
2,3,4-trimethoxystyryl isocyanate
5,6,7-trimethoxyisocarbostyril (known)

EXAMPLE 7

3,4,5-trimethoxycinnamoyl azide
3,4,5-trimethoxystyryl isocyanate
6,7,8-trimethoxyisocarbostyril (novel)

EXAMPLE 8

4-chloro-alpha-methylcinnamoyl chloride
4-chloro-alpha-methylcinnamoyl azide
4-chloro-alpha-methylstyryl isocyanate
7-chloro-3-methylisobarbostyril (novel)

EXAMPLE 9

3,4-dimethoxycinnamoyl chloride
3,4-dimethoxycinnamoyl azide
3,4-dimethoxystyryl isocyanate
6,7-dimethoxyisocarbostyril (known)

EXAMPLE 10

Isocarbostyril (known)

EXAMPLE 11

In order to compare the process of the invention with the closest prior art, it was attempted to prepare isocarbostyrils by boiling N-styryl carbamates in diphenyl ether by a procedure analogous to that described in Example 1. The carbamates were prepared from the corresponding cinnamoyl azide by heating with methanol. They had the following structure:

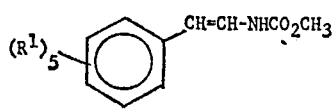

The results of the attempts are shown in Table III, and they are compared with the results found with the corresponding styryl isocyanate:

TABLE III

| $R_1$ in carbamate or isocyanate | Yield of isocarbostyril, from— | |
|---|---|---|
| | Carbamate, percent | Isocyanate, percent |
| None | 0 | 64 |
| 3,4-$(CH_3O)_2$ | 51 | 76.6 |
| 4-Cl | 14 | 69 |
| 2,3,4-$(CH_3O)_3$ | 0 | 81 |
| 3,4,5-$(CH_3O)_3$ | 0 | 21 |

The significant improvement in yield that is obtained by using the isocyanate rather than the carbamate is immediately obvious. It is also important to remember that the prior art was not aware that the carbamate could be used in the ring closure reaction to produce the isocarbostyril unless there was an electron-withdrawing radical in the alpha position.

Another illustration of the unexpectedly high yield obtained by the process of the invention is found in a comparison with the published results of cyclizing beta-phenethyl isocyanates to 3,4-dihydrocarbostyrils. The beta-phenethyl isocyanates that were studied had the formula:

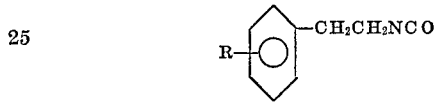

A comparison of the yields obtained is displayed in Table IV.

TABLE IV

| R in betaphenethyl isocyanate or styryl isocanate | Yield, percent of— | |
|---|---|---|
| | 3,4-dihydroisocarbostyril | Iso-carbostyril |
| 2,3,4-$(CH_3O)_3$ | ¹4 | 81 |
| 3,4,5-$(CH_3O)_3$ | ²19 | 21 |

¹ Manske et al., Can. J. Research 23B, 100 (1945).
² Manske et al., J. Can. Chem. Soc. 67–95 (1945).

It is pointed out that if it is desired to produce isocarbostyrils by the Manske et al. synthesis, the additional step of dehydrogenation must be carried out.

EXAMPLE 12

(a) By a procedure analogous to that described in Example 1,5-chloroisocarbostyril was prepared by cyclization of 2-chlorostyryl isocyanate. The 2-chlorostyryl isocyanate was derived ultimately from 2-chlorobenzaldehyde.

(b) 3-butylisocarbostyril was prepared by cyclization of alpha-butylstyryl isocyanate, by a procedure analogous to that described in Example 1.

(c) 4-methylsiocarbostyril was prepared by cyclization of beta-methylstyryl isocyanate by a procedure analogous to that described in Example 1.

What is claimed is:

1. Process which comprises subjecting a styryl isocyanate to an elevated temperature for a period of time sufficient to produce an isocarbostyril, wherein said styryl isocyanate is a compound of the formula:

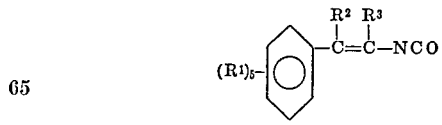

wherein each $R^1$ is hydrogen, or wherein not more than 2 $R^1$'s are selected from the group consisting of methyl, methoxy or ethoxy, provided that at least one $R^1$ represents hydrogen in a position ortho to the

and $R^2$ and $R^3$ are linear lower alkyl or hydrogen.

2. The process of claim 1 wherein said process is carried out in an inert, liquid reaction medium that has a boiling point, at atmospheric pressure, between about 200° and about 300° C.

3. The process of claim 4 wherein the inert, liquid reaction medium is diphenyl ether.

4. Process of claim 1 wherein said temperature is within the range of from about 200° C. to about 300° C.

5. The process of claim 1 wherein said inert, liquid reaction medium is the dibutyl ether of diethylene glycol.

6. The process of claim 1 wherein said process is carried out by refluxing said styryl isocyanate in an inert, liquid reaction medium at a temperature within the range of from about 200° C. to about 300° C.

7. The process of claim 6 wherein said inert, liquid reaction medium is diphenyl ether, the dibutyl ether of diethylene glycol, the acetate ester of the monobutyl ether of diethylene glycol, benzophenone, or dimethyl phthalate.

References Cited

UNITED STATES PATENTS

| 2,538,341 | 1/1951 | Ullyot | 260—289 |
| 3,452,027 | 6/1969 | Sulkowski | 260—289 |
| 2,647,902 | 8/1953 | Aschner | 260—289 |
| 3,370,078 | 2/1968 | Bennett | 260—453 |

OTHER REFERENCES

Fieser et al.: "Advanced Organic Chemistry," Reinhold (1961), p. 629.

DONALD G. DAUS, Primary Examiner

U.S. Cl. X.R.

260—283, CN, 288 R, 289 R, 340.5, 345.2, 346.2 R, 453 AR